Aug. 28, 1923.
J. KIEWICZ
STOP MOTION
Filed Aug. 8, 1922
1,466,402
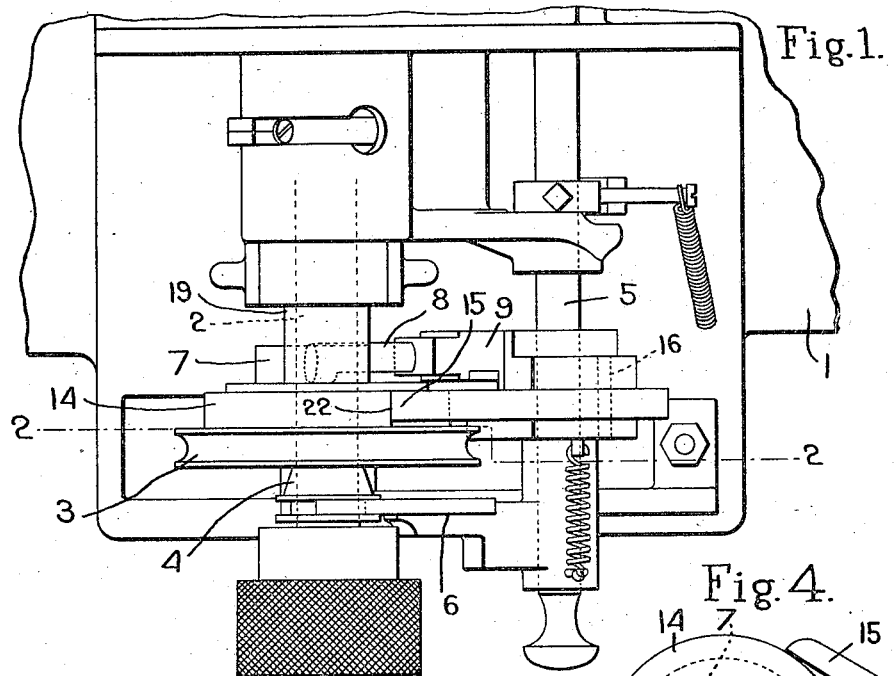
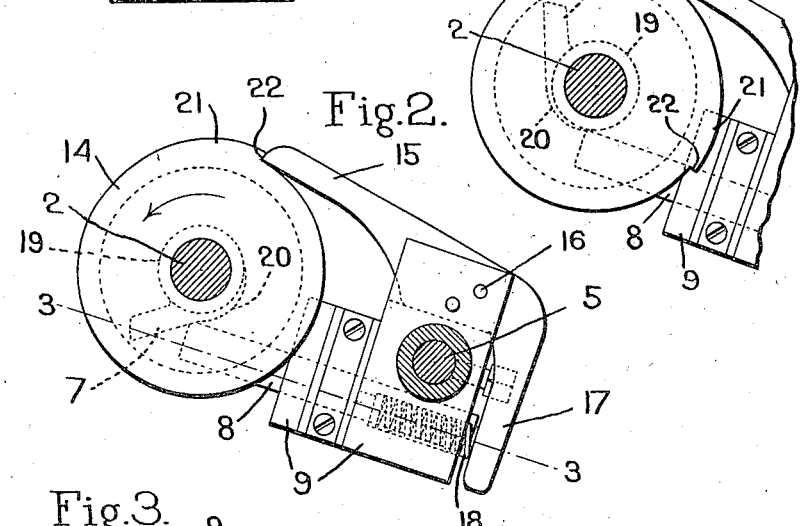
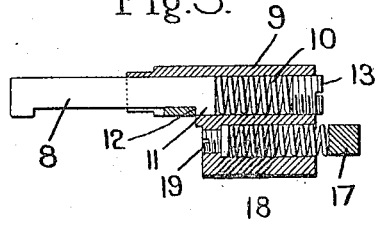
Inventor.
John Kiewicz
by Heard Smith & Tennant
Attys.

Patented Aug. 28, 1923.

1,466,402

UNITED STATES PATENT OFFICE.

JOHN KIEWICZ, OF BOSTON, MASSACHUSETTS, ASSIGNOR TO THE REECE BUTTON HOLE MACHINE COMPANY, OF BOSTON, MASSACHUSETTS, A CORPORATION OF MAINE.

STOP MOTION.

Application filed August 8, 1922. Serial No. 580,572.

*To all whom it may concern:*

Be it known that I, JOHN KIEWICZ, a citizen of the United States, and resident of Boston, county of Suffolk, State of Massachusetts, have invented an Improvement in Stop Motions, of which the following description, in connection with the accompanying drawing, is a specification, like characters on the drawing representing like parts This invention relates to stop motions such as are used in connection with various machines for bringing the machine to rest at the end of a cycle of operations, and one of the objects of the invention is to provide an improved stop motion which will perform its function and which will bring the machine to rest with a cushioned movement, and at the same time positively prevent any rebound.

Another object of the invention is to provide a stop motion of this character, which is simple in its construction and which comprises few parts, but which is effective and positive in its operations.

The invention is adapted for use in connection with a great variety of machines, and is of special advantage in connection with machines that are designed to run at a high speed, because when a high-speed machine is brought to rest, there is frequently a tendency for the driving shaft to rebound. The present invention not only brings the high-speed machine to rest with the desirable cushioned movement, but also positively prevents any rebound.

In order to give an understanding of the invention, I have illustrated it in the drawings as it might be applied to a button-hole sewing machine, but I wish it distinctly understood that the invention is not limited in its use to machines of this class.

In the drawings wherein I have illustrated a selected improvement of the invention, Fig. 1 is a plan view of the parts of the stop motion showing them in the positions they assume after the machine has been brought to rest.

Fig. 2, is a section on the line 2—2 Fig. 1.

Fig. 3, is a section on the line 3—3 Fig. 2.

Fig. 4, is a view somewhat similar to Fig. 2, but showing the parts in a different position.

In the drawing, 1, indicates a portion of the frame of the machine with which the stop motion is used, which in the present illustration is a button-hole sewing machine. 2, indicates the driving shaft by which the machine is operated. This shaft is driven from a driving element herein illustrated as a belt pulley 3, which is loosely mounted on the shaft and adapted to be connected thereto by means of a suitable clutch indicated generally at 4. This clutch is controlled by a controlling member 5, herein shown as a rod extending parallel to the shaft 2, and movable in the direction of its length for clutching the pulley 3 to the driving shaft. This controlling member is provided with an arm 6, extending to the clutch device 4, and by which the latter is actuated. To clutch the pulley 3 to the driving shaft, the control member 5 is moved toward the top of the sheet in Fig. 1, and movement of the clutch control in the opposite direction will disengage the clutch and release the driving pulley from the driving shaft.

The parts thus far described are or may be all as usual in devices of this character, and form no part of the present invention. In fact the construction and operation of the clutch herein illustrated is similar to that shown and described in U. S. Patent 1,326,668, dated Dec. 30, 1919.

In the present stop motion the driving shaft "2" is brought to rest by the co-operation of a stop arm which is fast to the shaft with a yieldingly sustained stop member. When the machine is in operation, the stop member is withdrawn from the path of movement of the stop arm, but when the clutch is disengaged, then the stop member is moved into the path of the stop arm and the engagement of the latter with the stop member brings the machine to rest.

This stop arm is shown at "7" and the stop member is shown at "8." The stop member is in the form of a bar which is slidably mounted in a bracket or block "9" that is rigid with the controlling member "5;" said stop member "8" is provided with a lateral projection "11" which engages a shoulder "12" on the bracket "9" thereby limiting the spring impelled movement. The spring "10" is shown as backed by a plug "13" which is screw-threaded into the member "9" and by which the tension of the spring may be controlled.

When the machine is in operation the stop member "8" is out of the path of movement of the stop arm "7." When the clutch is disengaged, the movement of the control "5" carries the stop member "8" into the path of movement of the stop arm "7" and the engagement of said stop arm with the stop member will bring the shaft to rest with a cushioned movement, it being understood that the driving shaft is rotated in the direction of the arrow Fig. "2."

My invention also comprehends a brake device for applying a brake resistance to the rotation of the shaft 2 after the clutch is disengaged and before and while the stop arm and stop member are performing their function in bringing the shaft to rest.

The purpose of the brake device is to slow down the shaft before the stop arm brings the shaft to rest.

The brake device comprises a brake drum 14, which is fast on the shaft 2, and a brake arm 15, which co-operates with the brake drum. The brake arm is normally out of engagement with the brake drum, but is shifted into operative engagement therewith when the clutch is disengaged and means are provided whereby the brake arm will apply an increasing braking pressure on the brake drum just before the stop engages the stop member, such braking pressure still further increasing, while the stop arm is acting against the stop member.

This brake arm 15 is shown as pivoted to block 9 at 16, and it is provided with a tail 17, which is engaged by a spring 18, also carried by the block 9. This spring is backed by a screw-threaded plug 19, so that the tension of the spring may be varied. The brake arm is carried by the block 9, and therefore when the clutch is engaged, the brake arm will be situated out of line with the brake drum 14. When however, the controlling member is carried into the position shown in Fig. 1, thereby to disengage the clutch, the brake arm 15, is carried into line with the brake drum 14.

The brake arm is brought into frictional engagement with the periphery of the brake drum 14, and the increased pressure of the brake arm against the brake drum is secured by the turning movement of the controlling member 5. The stop arm 7, is shown as formed on a sleeve 19, and the latter is provided with a cam surface 20, at the base of the stop arm 7.

In the operation of the device when the controlling member 5, is shifted to disengage the clutch and to carry the brake arm 15 into line with the brake drum 14, the engagement of the cam surface 20 with the end of the stop member 8, will depress the latter, thereby turning the shaft 5, and bringing the brake arm 15 into frictional engagement with the brake drum with an increased pressure, which pressure will keep on increasing until the machine is brought to rest. The function of the cam 20, therefore, is to turn the controlling member 5, so as to cause the brake arm 15 to bear harder against the surface of the brake drum, and the spring 18, permits such turning movement and also maintains the frictional engagement between the brake arm and brake drum.

This braking resistance is still further increased just before the machine is brought to rest by forming the brake drum with an eccentric portion 21, which rides under the brake arm 15, while the cam 20 is acting on the stop member 8. The combined action of cam 20, and of the eccentric portion 21, produces an increased frictional resistance of the brake, which slows down the machine to a great extent, so that the action of the stop arm against the stop member will bring the machine to rest with an easy cushioned movement.

I claim—

1. In a stop motion, the combination with a driving shaft, of a driving element therefor, a controlling member by which the driving element is operatively connected to or disconnected from the shaft, a brake drum fast on the shaft and having an eccentric portion, a brake member adapted to be brought into operative engagement with the brake drum when the driving element is disconnected from the driving shaft, and means operated by the rotation of the shaft to cause the brake member to have an increasing pressure on the brake drum just before and during the time that the eccentric portion thereof engages the brake member, whereby the braking action is caused partly by said eccentric portion and partly by said increased pressure.

2. In a stop motion, the combination with a driving shaft, of a driving element therefor, a controlling member by which the driving element is operatively connected to or disconnected from the shaft, a brake drum fast on the shaft and having an eccentric portion, a brake member adapted to be brought into operative engagement with the brake drum when the driving element is disconnected from the driving shaft, and means operated by the rotation of the shaft to cause the brake member to have an increasing pressure on the brake drum just before and during the time that the eccentric portion thereof engages the brake member, whereby the braking action is caused partly by said eccentric portion and partly by said increased pressure, said drum having a stop shoulder which is engaged by the brake member after the machine has come to rest, thereby to prevent rebound.

3. In a stop motion, the combination with a driving shaft, of a driving element therefor, a controlling rod by which the driving element is operatively connected to or disconnected from said shaft, a brake drum fast on the shaft, a brake arm carried by the controlling rod and adapted to be brought into position to engage the brake drum when the driving element is disconnected from the driving shaft, a stop member carried by the controlling rod, a stop arm fast on said shaft and adapted to engage the stop member to bring the shaft to rest, said stop arm having a cam associated therewith which acts on the stop member to give the control shaft a turning movement, thereby to cause the brake arm to apply an increased braking pressure on the brake drum, the latter having an eccentric portion which co-operates with said brake arm to augment the braking action.

4. In a stop motion, the combination with a driving shaft, of a driving element therefor, a controlling rod by which the driving element is operatively connected to or disconnected from said shaft, a brake drum fast on the shaft, a brake arm carried by the controlling rod and adapted to be brought into position to engage the brake drum when the driving element is disconnected from the driving shaft, a stop member carried by the control rod, a stop arm fast on said shaft and adapted to engage the stop member to bring the shaft to rest, said stop arm having a cam associated therewith which acts on the stop member to give the control shaft a turning movement, thereby to cause the brake arm to apply an increased braking pressure on the brake drum, the latter having an eccentric portion which co-operates with said brake arm to augment the braking action, and also having a stop shoulder to engage the brake arm, thereby to prevent rebound.

5. In a stop motion, the combination with a driving shaft of a driving element therefor, a control member by which the driving element is operatively connected to or disconnected from said shaft, a brake drum fast on the shaft, a stop arm fast on the shaft, a stop member to engage said arm and bring the shaft to rest, a brake member, means operated by the rotation of the shaft to cause the brake member to apply a braking action on the drum just before the shaft is brought to rest, said drum having a shoulder co-operating with the brake member to prevent rebound.

6. In a stop motion, the combination with a driving shaft of a driving element therefor, a control member for connecting said driving element to or disconnecting it from said shaft, a brake drum fast on the shaft and having an eccentric portion, a block secured to the control member, a brake arm pivoted to the block and adapted to engage the brake drum just before the machine is brought to rest, and a spring acting on the brake arm and providing a yieldingly frictional engagement between said arm and the brake drum.

In testimony whereof I have signed my name to this specification.

JOHN KIEWICZ.